(No Model.) 2 Sheets—Sheet 1.

C. PHILLIPS.
DRY ORE DRESSING AND GOLD SEPARATING APPARATUS.

No. 580,162. Patented Apr. 6, 1897.

Witnesses
Inventor
Charles Phillips
Attorneys (No Model.) 2 Sheets—Sheet 2.
C. PHILLIPS.
DRY ORE DRESSING AND GOLD SEPARATING APPARATUS.
No. 580,162. Patented Apr. 6, 1897.
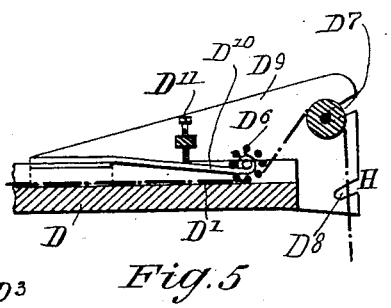
Fig. 5
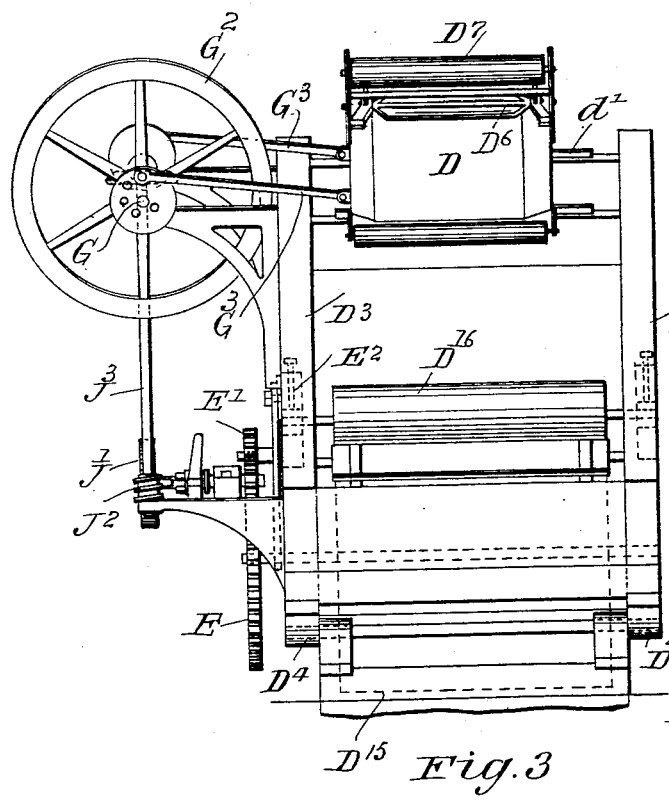
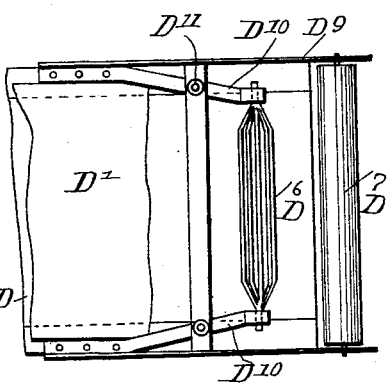
Fig. 6
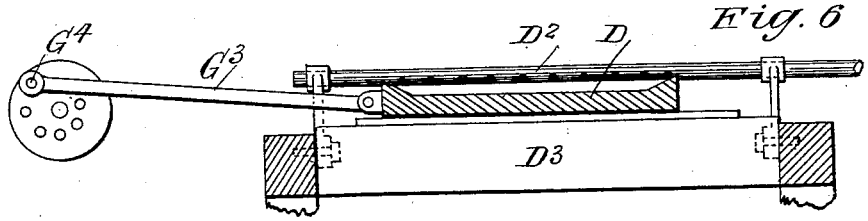
Fig. 3
Fig. 4
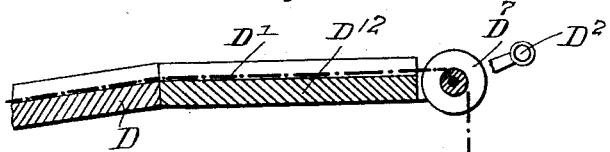
Fig. 7
Witnesses
H. van Oldenneel
E. A. Scott
Inventor
Charles Phillips
by Richardson
Attorneys

United States Patent Office.

CHARLES PHILLIPS, OF SOUTH YARRA, VICTORIA, ASSIGNOR OF THREE-FOURTHS TO JOHN McALISTER HOWDEN, OF MELBOURNE, VICTORIA.

DRY ORE-DRESSING AND GOLD-SEPARATING APPARATUS.

SPECIFICATION forming part of Letters Patent No. 580,162, dated April 6, 1897.

Application filed January 6, 1896. Serial No. 574,497. (No model.) Patented in New South Wales July 4, 1889, No. 1,521, and August 9, 1892, No. 3,893; in Victoria August 3, 1892, No. 9,843; in Queensland August 11, 1892, No. 2,136; in South Australia August 25, 1892, No. 2,289; in Western Australia September 8, 1892, No. 367, and in New Zealand July 4, 1895, No. 7,728.

*To all whom it may concern:*

Be it known that I, CHARLES PHILLIPS, mining-engineer, a subject of the Queen of Great Britain and Ireland, residing at No. 35 Tivoli Road, South Yarra, in the British Colony of Victoria, have invented a certain new and useful Dry Ore-Dressing and Gold-Separating Apparatus, (for which patents have been obtained in New South Wales, No. 1,521, dated July 4, 1889, and No. 3,893, dated August 9, 1892; in Victoria, No. 9,843, dated August 3, 1892; in Queensland, No. 2,136, dated August 11, 1892; in South Australia, No. 2,289, dated August 25, 1892; in Western Australia, No. 367, dated September 8, 1892, and in New Zealand, No. 7,728, dated July 4, 1895,) of which the following is a specification.

This invention consists of a dry ore-dressing and gold-separating apparatus which has been designed for the better treatment of gold-bearing or other metalliferous substances when in a pulverized or partly-pulverized condition by the dry method for the purpose of concentrating or separating or for partly concentrating or separating the valuable parts from the waste, or the more from the less valuable parts of such substances without using water in the process.

The apparatus will now be described by aid of a reference to the accompanying sheet of drawings, in which—

Figure 1:
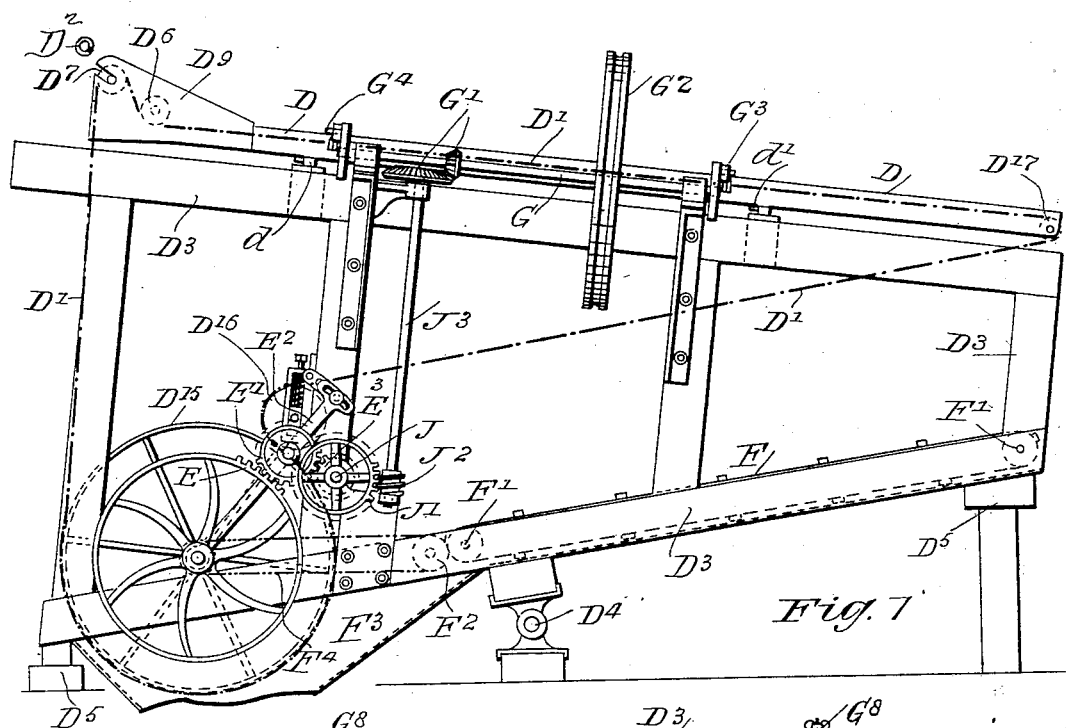
Figure 2:
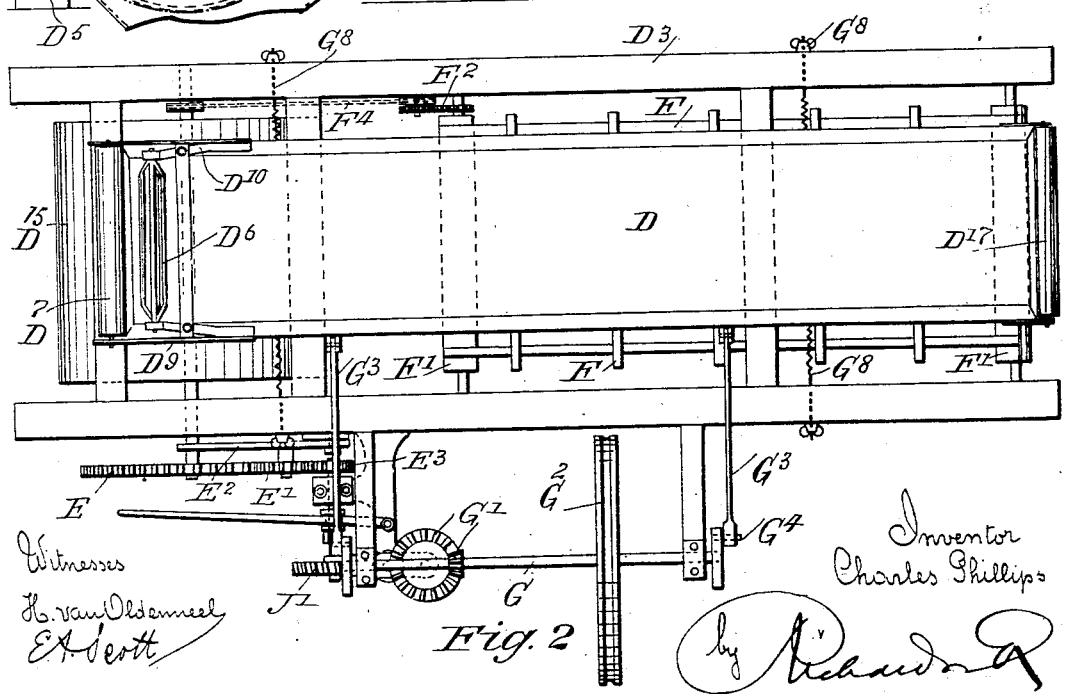

Figure 1 is a side elevation, Fig. 2 a plan, and Fig. 3 an end elevation, of the apparatus; Fig. 4, a cross-section of the table, showing the mechanism for giving it a side shake and the perforated air-pipe; Fig. 5, a sectional side view, and Fig. 6 a plan, of the upper part of table and showing the rise in the belt. Fig. 7 is also a sectional view of upper part of table when its incline is decreased thereat.

D is the shaking-table, over the upper surface of which the endless revolving belt D' passes, such belt having a rise at its upper part when used for separating gold or other valuable substances of small bulk. Said rise is for the purpose of preventing or partly preventing or retarding gold or other valuable material being carried over the head or upper end of the table and for collecting it at the bottom of said rise ready for removal for melting or other final treatment, or the tables may be arranged with the belt D' in one continuous line or plane to allow the richer and concentrated material to fall freely over the upper end of the table while the waste material or tailings run off at the lower end, while either the concentrated material that is carried over the upper end of the tables or the portion that passes off at the lower end may be reserved for further treatment. For this purpose the concentrated material is caused to pass off at H by placing the roller $D^7$ in the position shown, as $D^8$ in Fig. 5, or the tables may be made with a decreasing incline $D^{12}$ at the upper end, as shown in Fig. 7, and they may have currents of air from a perforated pipe, as $D^2$, proceeding from a Roots blower or other suitable apparatus directed against the upward course of the material upon the belt for the purpose of driving back the light and valueless dust or sand that would otherwise be carried over the head of the table.

The table D is supported on a framing $D^3$, pivoted or centered at about midway of its length at $D^4$, the frame when set being secured at the requisite incline by blocks or chocks $D^5$ or by any other suitable means. The endless belt D' travels over the top of table D, while at the rise it passes under roller $D^6$ and over roller $D^7$, said latter being supported by such as cheeks or brackets $D^9$, attached to table, while roller $D^6$ is supported in bearings at end of spring-arms $D^{10}$, also attached to table, and said spring-arms are acted on by pinching-screws $D^{11}$, the purpose of which is to adjust height of roller.

The endless belt D' passes down from upper end of table and partly around drum or roller $D^{15}$, and thence up and over tension-roller $D^{16}$, both rollers being supported in bearings upon framing $D^3$. From roller $D^{16}$ the endless belt extends to the end roller $D^{17}$ of table D and thence above its top surface to under the top roller $D^6$, before described.

The bearing for roller $D^{16}$ may be of the sliding type, as shown in Fig. 1, acted on by a spring. Said drum $D^{15}$ imparts motion to the endless belt $D'$, the spindle of drum having a spur-wheel E on it, which is driven by a pinion $E'$, carried on an adjustable arm $E^2$, the purpose of the latter being to support a larger or smaller pinion $E'$, as the case may require, in order to drive the endless belt at the desired speed. Pinion $E'$ gears with another pinion $E^3$, arranged upon a suitably-supported spindle J, which has a tangent-wheel $J'$ on it, which gears with the worm $J^2$, secured on vertical spindle $J^3$, and to which latter spindle motion is imparted by the bevel-gears $G'$ from spindle G, the latter being driven by the rope-pulley $G^2$.

F is an endless brush or scraper supported on end rollers $F'$, as shown in Figs. 1 and 2, and to which motion is imparted through medium of toothed gears $F^2$, driven by belt $F^4$ from spindle of drum $D^{15}$.

$F^3$ is a receptacle into which the brush sweeps the dust, &c., and from which receptacle it may be delivered to a bin to await further treatment, or it may be fed to another similar table, or, in fact, it may be returned to the same table for further treatment.

$d$ are transverse metal guide-bars upon frame $D^3$, and $d'$ slide-bars on under side of table D.

To impart the shake to table D, it has rods $G^3$ attached to it, and which rods are centered on crank-pins $G^4$, secured to disks, one upon each end of shaft G, and which disks have a number of spirally-arranged holes in them in order that the side shake or length of stroke of the table may be varied.

$G^8$ are springs connecting table D with its framing $D^3$ in order to retain the table in a state of equilibrium, and so lessen the jar upon the bearings.

Although I have fully described herein and shown in the drawings one means for constructing my dry ore-dressing and gold-separating apparatus, I wish it to be understood that I do not confine myself to the precise details employed therein, as other modified means or devices may be used to produce the same result.

Having now described my invention, what I claim as new, and desire to secure by Letters Patent, is—

1. In combination, the frame, the endless belt, the rollers on the frame for directing the belt and for giving it an incline, said belt having an abrupt upward incline at its upper discharge end to prevent the gold being carried over said end, substantially as described.

2. In combination, the main frame, the belt having guiding means on said frame for giving it an upward inclination and having an abrupt upward rise at its upper end and an air-pipe extending laterally across the belt, substantially as described.

In witness whereof I have hereunto set my hand, in presence of two witnesses, this 13th day of November, 1895.

CHARLES PHILLIPS.

Witnesses:
  D. R. BODYCOMB,
  BEDLINGTON BODYCOMB.